United States Patent
Brüssel

(10) Patent No.: US 7,354,540 B2
(45) Date of Patent: Apr. 8, 2008

(54) METHOD FOR MANUFACTURING FIBER-REINFORCED MOLDINGS

(75) Inventor: Richard Brüssel, Sulzfeld (DE)

(73) Assignee: Maschinenfabrik J. Dieffenbacher GmbH & Co., Eppingen (DE)

( * ) Notice: Subject to any disclaimer, the term of this patent is extended or adjusted under 35 U.S.C. 154(b) by 207 days.

(21) Appl. No.: 10/623,721

(22) Filed: Jul. 22, 2003

(65) Prior Publication Data

US 2004/0135285 A1    Jul. 15, 2004

(30) Foreign Application Priority Data

Jul. 22, 2002    (DE) ............................... 102 33 300

(51) Int. Cl.
*B29C 43/20*    (2006.01)
*B29C 70/28*    (2006.01)

(52) U.S. Cl. ..................................... 264/113

(58) Field of Classification Search ........ 264/112–113, 264/119, 235, 235.6, 236, 156, 160, 320, 264/325
See application file for complete search history.

(56) References Cited

U.S. PATENT DOCUMENTS

| | | | |
|---|---|---|---|
| 4,141,929 A | * | 2/1979 | Stoops et al. ............... 260/862 |
| 4,238,176 A | | 12/1980 | Cottrell, Jr. et al. |
| 4,894,292 A | | 1/1990 | Dibuz et al. |
| 4,973,440 A | * | 11/1990 | Tamura et al. ............... 264/114 |
| 5,202,071 A | | 4/1993 | Nakamura et al. |
| 6,838,148 B1 | * | 1/2005 | Ehnert et al. ............... 428/109 |
| 2003/0083423 A1 | * | 5/2003 | Wierconski et al. ........ 524/522 |

FOREIGN PATENT DOCUMENTS

| | | |
|---|---|---|
| CA | 2 383 550 A1 | 3/2001 |
| DE | 40 11 104 C1 | 4/1990 |
| DE | 199 49 318 A1 | 3/2001 |
| DE | 19949318 | 3/2001 |
| JP | 02-018008 A | 1/1990 |
| JP | 04-135704 * | 5/1992 |

* cited by examiner

*Primary Examiner*—Jill L. Heitbrink
(74) *Attorney, Agent, or Firm*—Foley & Lardner LLP

(57) ABSTRACT

A method for manufacturing fiber-reinforced moldings in a resin mat apparatus. The manufacturing procedure is performed in a continuous manner of operation from the mixing of the components of the resin mixture to the procedure of pressing a molding. The apparatus includes a controlled-temperature, continuous thickening unit for a time-prescribed maturation process of the endless resin mat. Endless belts carry the endless resin mat in a meander or serpentine path through the continuous thickening unit, maintaining the resin mat between the belts in the thickening unit until the resin mat has matured or aged to an appropriate plasticity for an immediately following direct conversion to moldings in a heated molding press. In one preferred embodiment, there are no plastic films interposed between the belts and the resin mixture.

9 Claims, 1 Drawing Sheet

METHOD FOR MANUFACTURING FIBER-REINFORCED MOLDINGS

BACKGROUND OF THE INVENTION

The invention relates to a method for the manufacture of fiber-reinforced moldings (SMC), in which the manufacturing procedure is performed in a resin mat forming apparatus, from the mixing of the individual components of the resin, up to the procedure of pressing moldings, in a continuous procedure, and it furthermore relates to an apparatus for the practice of the method.

On account of their good mechanical properties and low price, such moldings made by the SMC process are the most widely used thermosetting fiber-reinforced plastics.

Formerly, for the production of SMC parts, first the raw material was made, consisting of a resin mass (resin mixture) with embedded chopped glass fibers. This resin mixture is laid onto thin, transparent plastic films (carrier films) and subjected to a maturation process. The present-day maturation process takes around 4-5 days and serves to thicken the fillers added to the resin mixture. The resin mixture consists of resins, thermoplastic solutions, fillers, flow improvers, integrated parting agents, inhibitors and hardeners. It is stirred to form a well-dispersed liquid at a given temperature and on the resin mat apparatus it is also provided with a thickening agent in powder or liquid form, and spread with doctor blades onto the top and bottom carrier film and adjusted for width. The chopped glass from endless rovings, for example, is fed by chopping machines onto the bottom carrier film. Then the upper carrier film with the resin mixture is laid onto the chopped fiber coat. In a fulling process that follows, the fibers are mixed or imbibed with the resin mixture and then wound onto a roll as a resin mat or as a flat semi-finished product for the curing process. The ripening process makes the resin mixture so strong that the carrier films can be completely withdrawn, and in the extrusion process the glass fibers flow along with the matrix.

Shapes are cut from the flat semi-finished product or rolls to correspond to the molding being produced, and they are placed and pressed singly or in packs in a molding press.

The disadvantage of this method is that the SMC semi-finished product cannot be worked until after a long maturation period, thereby increasing the manufacturing costs.

It is also a disadvantage that the semi-finished product wound on a roll becomes distorted during the maturation process. If the roll lies on the floor, the pressure on the bottom SMC layers and hence a displacement of the material to the upper side. If the rolls are suspended on a shaft, the negative effect during the maturation is the opposite: the material flows downwardly and the layers of the material in the bottom part of the roll will have greater weights per unit area than the upper web layers. These unavoidably different weights per unit area make it necessary to cut the mats for each mold not just to length but also to weigh them so as to have equal bulk and thus equal part density. If the weights per unit area of the webs were constant, the necessary SMC web pieces could be cut automatically with a length gauge, which considerably reduces costs and would improve the quality of the moldings. This composition of the mats varying in thickness is also the reason why the manufacture of SMC moldings has never before been satisfactorily automated.

Another disadvantage of the former SMC manufacture is to be seen in the non-recyclable support films, which is another cost factor in the manufacturing process.

SUMMARY OF THE INVENTION

The invention is addressed to the problem of devising a method whereby it is possible to provide the resin mats (SMC semi-finished product) with the appropriate plasticity for an immediately following direct conversion to moldings, and to create an apparatus for the practice of such a method.

The solution as to the method includes the feature that, up to the pressing process, the resin mixture is prepared in a continuous procedure with the following process steps. In a first step, a fast-reacting thickener is finally combined with the resin mixture that has first been produced by vigorous mixing together of the precisely proportioned ingredients; the resin mixture is then spread in the appropriate thickness onto a lower belt and an upper belt by means of doctor blades, according to the formula. Also, chopped glass fibers, made for example from endless rovings by chopping mechanisms, and/or long or staple fibers, are proportioned onto the lower resin layer, and after combining the two resin layers in a resin mat apparatus designed as a kneading and imbibing system, a continuous resin mat is formed. For maturation, this endless resin mat is then passed back and forth with the belts for a specific period of time in a controlled-temperature thickening system, the maturing process depending on the run-through time and the heat in the encapsulated continuous thickening system, and after division into predetermined shapes they are delivered to a further processing system, such as a heated molding press, and made into moldings.

With the measures taken by the method of the invention it is possible to produce fiber-reinforced moldings in a continuous direct process without any hold-over for the maturing process.

For the successful operation of the process, however, all of its steps are to be performed logically. This applies both to the known process steps and for the new ones, with the following consequences:

The formulas for the mixing of the resin must be followed precisely, because:

The resin ingredients must be vigorously mixed and a suitable fast-reacting thickening agent must be admixed in the sufficient amount, and A short maturing period and a controlled heat input to the continuous resin mat in the continuous thickening apparatus must be determined and maintained by proper metering methods in accordance with the components used and their percentage in the resin mixture.

The controlled input of heat to the resin mat results for one thing in a decrease in viscosity over a limited period of time, permitting the rapid swelling of the fillers, and on the other hand it initiates the cross-linking of the plastic. Through the use of a plurality of belts and their chosen length in the continuous thickening apparatus, the maturation process can be timed and/or regulated by varying the rate of production.

In one preferred embodiment, the apparatus for the practice of the method includes mixing stations for the components of the resin mixture as well as:

two doctor blades spreading the resin on a lower and upper belt;

a device for applying the chopped glass to the lower layer of resin;

a kneading and imbibing section for forming an endless resin mat;

a continuous thickening system for the maturation of the meandering resin mat passing over controlled-temperature belt supports;

a cutting mechanism to cut the patterns to length and shape as the resin mat issues from the continuous thickening apparatus; and a molding press into which the patterns are deposited singly or in packets and can be pressed to form the molding.

This apparatus has the advantage of enabling a selective, accurate and controlled performance of the method to be set up successfully in continuous production. With the continuous thickening apparatus it has especially been possible to arrange the specifically timed maturation process in a vertical meander, depending on the necessary length of the thermostatically controllable belt supports, and to contain it within a compact housing.

The maturation system can be designed for the correct maturation time by arranging the belts and their design as to their length and number. Another cost advantage and simplification of the apparatus is to be seen in the fact that disposable films are not used for the shaping and transport of the continuous resin mat; although this would also be possible; instead, endless belts are provided for permanent use.

The following are advantages of the method and apparatus:

Improvement of the process to achieve better quality moldings.

Improvement of process efficiency by avoiding semi-finished products, thus reducing molding cost.

No holding over of semi-finished products at different temperatures, no material fluctuations due to differences in the storage of materials, such as summer goods and winter goods. No need for interim storage capacities. Different formulas are possible in SMC manufacture.

Since the process is continuous the homogeneity of the resin mats is outstanding. This leads to very uniform moldings and greatly reduced final finishing operations.

Repeatability is assured by the small amount of material in process.

The difficulties involved in semi-finished product transportation, such as the effect of temperature fluctuations, time in storage, and moisture, are avoided.

Improvement of surface quality by uniform rheological properties.

Possibility of feeding several press stations by designing the resin mat units accordingly.

The continuous, direct supplying of the fiber-reinforced thermoset material mixture avoids variations in the quality of the material during fabrication.

As the advantage and the result of all steps and features of the apparatus according to the invention, mats cut to shape, made with the correct plasticity, can be delivered into a direct SMC process for further manufacture into fiber-reinforced thermoset plastic moldings, that is to say, the SMC direct process is able to provide the fabricator with highly repeatable thermoset materials reinforced with long fibers.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWING

The accompanying drawing, which is incorporated in and constitutes a part of the specification, illustrates one presently preferred exemplary embodiment of the invention, and, together with the general description given above and the detailed description of the preferred embodiments given below, serves to explain the principles of the invention.

Additional advantageous measures and embodiments of the subject matter of the invention are to be found in the following description with the drawing, in which.

DETAILED DESCRIPTION OF PREFERRED EMBODIMENTS

Figure 1:
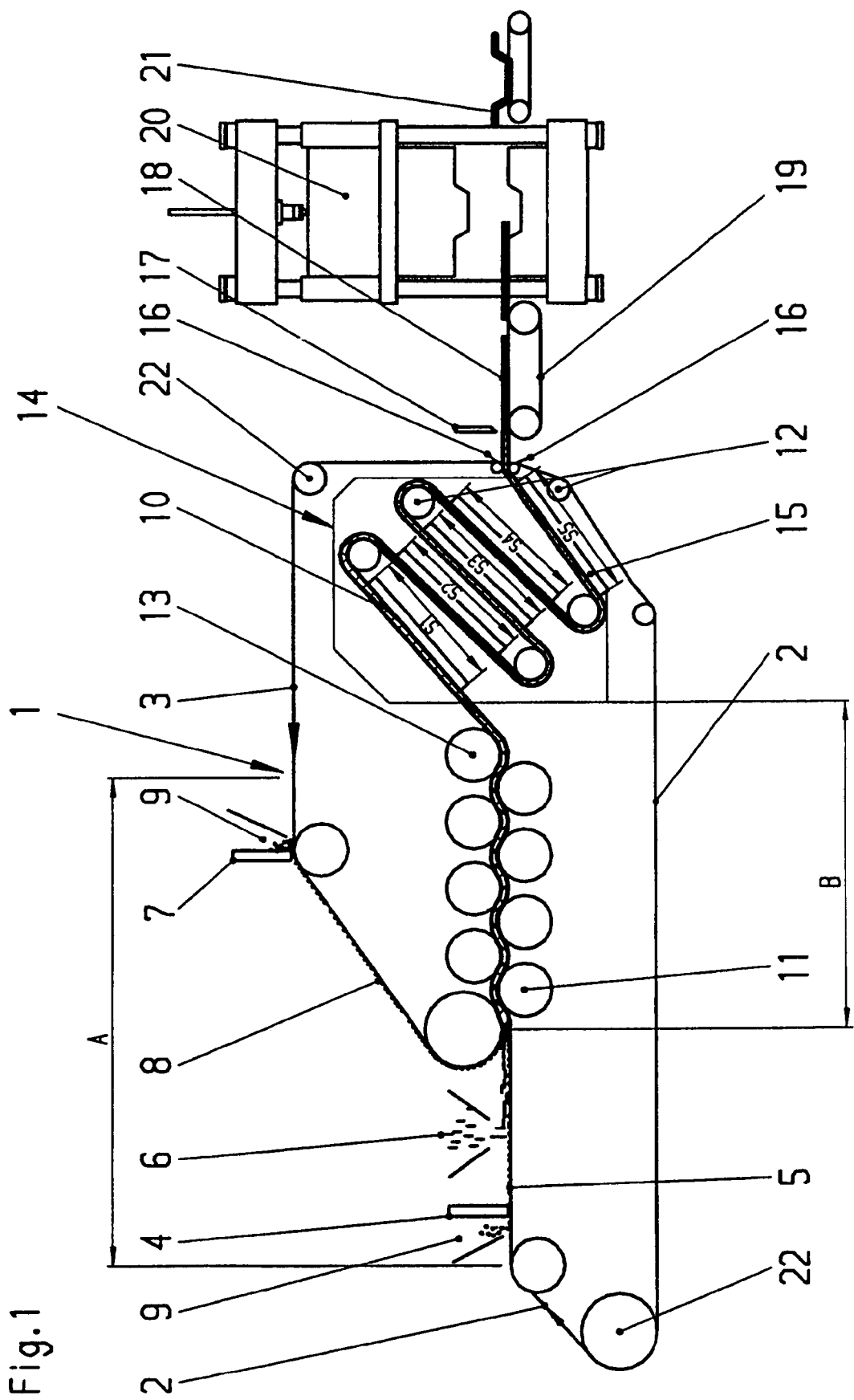
FIG. 1 is a schematic side view of a resin mat apparatus according to one preferred embodiment of the invention.

In one preferred embodiment, FIG. 1 shows a side view of the resin mat apparatus 1 according to the invention for practicing the method. Its principal parts include the resin mixture application or feeding section A, the kneading and imbibing section B and the continuous thickening section 14. The mixing station for mixing the individual components for the resin mixture 9 is not shown, since it pertains to the prior art. The resin mat apparatus 1 shows especially that in the kneading and imbibing section B as well as in the continuous thickening apparatus 14 it is not disposable films that are used, but re-usable, endless belts 2 and 3 which carry the resin mat 10 over guide rolls 22 through the apparatus. The premixed resin mixture 9 is first spread with the lower doctor blade 4 onto the lower belt 2 to form the starting resin layer 5. Then chopped glass 6 or long fibers are metered onto this lower resin layer 5. Endless fibers or fiber mats can also be inserted, especially for load-bearing parts. The spreading of the resin layer 8 by the upper doctor blade 7 on the upper belt 3 takes place simultaneously.

After the two resin layers 5 and 8 are brought together and have been introduced between the lower and upper rolls 11 and 13 the resin mat 10 is shaped in the kneading and imbibing section B, wherein the glass fibers or other fibers are imbibed with the plastic in the resin mixture 9 and are worked into it. The endless resin mat 10 thus formed is then carried by drive rolls 12, which are always in contact with belts 2 and 3, through a temperature-controlled and fully enclosed continuous thickening apparatus 14. In it the belts 2 and 3 with the resin mat 10 are likewise driven by drive rolls 12 and carried around the belt supports 15. The number and length S of the belt supports 15, as well as the heat put into them varies according to the specified maturation time. The length of the entire maturation section S then adds to the length of the individual sections $s_1$ to $s_5$ of the belt supports 15. The resin mat apparatus 1 is rendered short and compact by arranging the belt supports 15 in a meander, one over the other. It is also an advantage that dimensions of the continuous thickening apparatus 14 are easy to calculate for the necessary parameters.

When the resin mat 10 has matured it is released by knife blades from the belts 2 and 3 and fed to the cutting mechanism 17 downstream from gauging bars 16. In the cutting mechanism 17 the resin mat 10 is cut to length, or also to width, depending on specifications, delivered in the form of cut blanks or patterns 18 by the feed belt 19 to the molding press 20, and pressed to shape 21 and cured.

One preferred embodiment of the method of the invention is a method for the manufacture of fiber-reinforced moldings (SMC), in which the manufacturing procedure is performed in a resin mat apparatus (1) from the mixing of the individual components of the resin formulation (9) to the procedure of pressing a molding in a continuous manner of operation by the following process steps:

1. Finally a fast-reacting thickening agent is admixed by intensive mixing of the precisely metered components,
2. The resin formulation (9) is spread, proportionally as prescribed, onto a lower belt (2) and an upper belt (3) by means of doctor blades (4 and 7), to form resin formulation layers (5 and 8) of suitable thickness,
3. Onto the bottom resin formulation layer (5) chopped glass (6), for example made of endless rovings with cutting mechanisms, and/or long fibers, are metered on and after bringing together the two resin formulation layers (5 and 8) formed into an endless resin mat in a resin mat apparatus (1) designed as a kneading and imbibing system (B),
4. For a timed maturation process, the endless resin mat (10) is then carried in a meander by the belts (2 and 3) through a controlled-temperature, continuous thickening unit (14), the maturation process depending upon the time of passage through it, and on the heat in the encapsulated continuous thickening unit, and
5. After division into predetermined patterns (18) they are fed to further processing, for example to a heated molding press (20), and pressed to form moldings (21).

Another preferred embodiment is a method according to the embodiment above, characterized in that the required maturation process time is established by the selectable length of the carrying belt (15) in the continuous thickening unit (14) and the rate of production.

One preferred embodiment of an apparatus of the invention includes an apparatus for the practice of the method in a resin mat apparatus (1) according to the embodiments in paragraphs 0025 and 0026 above including mixing stations for the resin formulation components, two doctor blades (4 and 7) spreading the resin formulation (9) onto a lower and an upper belt (2 and 3), an apparatus for applying chopped glass (6) to the lower resin formulation layer (5), a kneading and imbibing section (B) for forming an endless resin mat (10), a continuous thickening box (14) for the process of maturation of the resin (10) passing meander-wise over temperature-controllable carrier belts (15), a cutting mechanism (17) for the proper cutting to length of blanks (18) upon the emergence of the resin mat (10) from the continuous thickening box (14) and a molding press in which the blanks (18) are deposited singly or as a packet and can be pressed to form the molding.

Another preferred embodiment is an apparatus according to the embodiment of paragraph 0027 above, characterized in that the belts (2 and 3) are made endless and sufficiently strong for continuous operation.

Yet another preferred embodiment is an apparatus according to the embodiments of paragraphs 0027 or 0028 above, characterized in that the length of the maturation section is composed of a plurality of partial lengths ($s_1+s_2+s_3 \ldots S_n$) of the carrier belts (15) arranged one over the other.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

The priority document here, DE 10233300.9 filed Jul. 22, 2002, is hereby incorporated by reference.

What is claimed:

1. A method for manufacturing fiber-reinforced moldings, the method comprising: performing a manufacturing procedure from a mixing of components to a procedure of pressing a molding in a continuous manner of operation by the following process steps:

mixing a thickening agent with a resin mixture;

spreading the resin mixture onto a lower belt and an upper belt, to form lower and upper resin mixture layers;

depositing, onto the lower resin mixture layer, fibers selected from the group consisting of chopped glass fibers and/or long fibers, and bringing together the lower and upper resin mixture layers and conveying them into a kneading and imbibing system in a resin mat apparatus to form an endless resin mat;

for a time-prescribed maturation process, carrying the endless resin mat in a meander by the lower and upper belts through a controlled-temperature, continuous thickening unit, wherein no further maturation process is performed after the endless resin mat is released from the lower and upper belts;

dividing the endless resin mat into predetermined patterns, feeding the patterns to a heated molding press, and pressing the patterns to form moldings.

2. The method according to claim 1, characterized in that a maturation process time is established by a selectable length of belt supports in the continuous thickening unit and a rate of production.

3. The method according to claim 1, wherein the continuous thickening unit is enclosed.

4. The method according to claim 1, wherein the step of carrying the endless resin mat through a controlled-temperature, continuous thickening unit comprises passing the endless resin mat over controlled-temperature, elongated belt supports.

5. The method according to claim 1, further comprising carrying the endless resin mat without interposing a film between the endless resin mat and a respective one of the lower and upper belts.

6. A method for continuously manufacturing fiber-reinforced moldings, the method comprising the following process steps:

mixing a thickening agent with a resin mixture;

spreading the resin mixture onto a lower belt and an upper belt without interposing a film between the resin mixture and a one of the lower and upper respective belts, to form lower and upper resin mixture layers;

depositing, onto the lower resin mixture layer, fibers selected from the group consisting of chopped glass fibers and/or long fibers, and bringing together the lower and upper resin mixture layers and conveying them into a kneading and imbibing system in a resin mat apparatus to form an endless resin mat;

carrying the endless resin mat in a meander by the lower and upper belts through a controlled-temperature, continuous thickening unit for a time-prescribed maturation process, wherein no further maturation process is performed after the endless resin mat is released from the lower and upper belts; and dividing the endless resin mat into predetermined patterns, feeding the patterns to a heated molding press, and pressing the patterns to form moldings;

wherein each of the lower and upper belts comprise an endless belt that extends from a location where the resin mixture is spread and the fibers are deposited to a location proximate where the endless resin mat is divided.

7. The method according to claim 6, further comprising a step of maintaining the endless resin mat between the lower and upper belts until the endless resin mat has matured.

8. The method according to claim 6, wherein the carrying step includes carrying the endless resin mat without interposing a film between the endless resin mat and a respective one of the lower and upper belts.

9. The method according to claim 6, wherein the carrying step includes passing the endless resin mat over controlled-temperature, elongated belt supports.

* * * * *